(12) United States Patent
Kennedy

(10) Patent No.: US 6,292,942 B1
(45) Date of Patent: Sep. 18, 2001

(54) MANAGER FOR DYNAMIC COMPLEX SYSTEMS

(75) Inventor: John Edwin David Kennedy, Brampton (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/206,213

(22) Filed: Dec. 7, 1998

(51) Int. Cl.[7] .................................................. G06F 9/445
(52) U.S. Cl. ............................................................ 717/11
(58) Field of Search ................................................ 717/11

(56) References Cited

U.S. PATENT DOCUMENTS

| | | | |
|---|---|---|---|
| 5,471,617 | 11/1995 | Farrand et al. | 395/700 |
| 5,559,958 * | 9/1996 | Farrand et al. | 395/183.03 |
| 5,651,006 | 7/1997 | Fujino et al. | 370/408 |
| 5,774,669 * | 6/1998 | George et al. | 395/200.54 |

* cited by examiner

Primary Examiner—Mark R. Powell
Assistant Examiner—Michael B. Holmes (57) ABSTRACT

A manager for a dynamic complex system is disclosed which associates a single, simple, versatile and malleable Management Scheme with each entity of the system, including the system itself. The Management Scheme permits management of systems via the mapping of information to a simple hierarchical management level wherein all of the information necessary to manage the system can be manipulated and communicated throughout the system via simple arithmetic operations. The Management Scheme is a compound integer number computed from management kernels and is stored in a Management Field of a Control Parameter. The Control Parameter also includes an Identifier Field storing a code number which identifies a particular entity. Management kernels are integer primes to an integer power of one or more.

15 Claims, 11 Drawing Sheets

| MEANING | PRIME FACTOR ($k_i$) | POWER OF THE PRIME FACTOR (n) | KERNEL $k_i^n$ |
|---|---|---|---|
| INPUT DATA | 5 | 1 | 5 |
| | 3 | 1 | 3 |
| NO MANGEMENT REQUIRED OR OTHER CHOICE OF TWO | NONE | N/A | 1 |
| A NEGATIVE PARAMETER VALUE | 2 | 1 | 2 |
| A ZERO PARAMETER VALUE | 2 | 2 | 4 |
| A POSITIVE PARAMETER VALUE | 2 | 3 | 8 |

| C | S |
|---|---|
| G1 | 1 |
| G2 | 10 / 20 / 40 |
| G3 | 15 |
| G4 | 15 |
| G5 | 3 |
| G6 | 1 |
| G7 | 1 |
| G8 | 1 |

| C (column 1) | S (column 2) | S/5 (column 3) | S/5 AN INTEGER? (column 4) | MANGER CONCLUSION (column 5) |
|---|---|---|---|---|
| G1 | 1 | 0.2 | NO | NOT OF INTEREST |
| G2 | 10 / 20 / 40 | 2 / 4 / 8 | YES | INPUT IDENTIFIED |
| G3 | 15 | 3 | YES | INPUT IDENTIFIED |
| G4 | 15 | 3 | YES | INPUT IDENTIFIED |
| G5 | 3 | 0.6 | NO | NOT OF INTEREST |
| G6 | 1 | 0.2 | NO | NOT OF INTEREST |
| G7 | 1 | 0.2 | NO | NOT OF INTEREST |
| G8 | 1 | 0.2 | NO | NOT OF INTEREST |

| C | S | S/3 | S/3 AN INTEGER? | MANAGER CONCLUSION |
|---|---|---|---|---|
| G2 | 10 / 20 / 40 | 3.3 / 6.6 / 13.3 | NO | NON-DATA INPUT |
| G3 | 15 | 3 | YES | DATA INPUT |
| G4 | 15 | 3 | YES | DATA INPUT |

| C | S | S/2 | S/2$^2$ | S/2$^3$ | S/2$^4$ | MANAGER CONCLUSION |
|---|---|-----|---------|---------|---------|--------------------|
| G2 | 10 | 5 | 2.5 | 1.25 | 0.625 | $k_i^n$ INDICATES A NEGATIVE PARAMETER VALUE: GO TO G7 TO CALCULATE $|a-b|$ |
| G2 | 20 | 10 | 5 | 2.5 | 1.25 | $k_i^n$ INDICATES A ZERO PARAMETER VALUE: GO TO G6 TO CALCULATE $a+b$ |
| G2 | 40 | 20 | 10 | 5 | 2.5 | $k_i^n$ INDICATES A POSITIVE PARAMETER VALUE: GO TO G8 TO CALCULATE $a \bullet b$ |

| $m_F$ | $k_i^n$ |
|---|---|
| $m_F = 0.00$ | $k_{F11} = 31$ |
| $0.00 < m_F \leq 0.30$ | $k_{F10} = 29$ |
| $0.30 < m_F \leq 0.48$ | $k_{F9} = 23$ |
| $0.48 < m_F \leq 0.60$ | $k_{F8} = 19$ |
| $0.60 < m_F \leq 0.70$ | $k_{F7} = 17$ |
| $0.70 < m_F \leq 0.78$ | $k_{F6} = 13$ |
| $0.78 < m_F \leq 0.85$ | $k_{F5} = 11$ |
| $0.85 < m_F \leq 0.90$ | $k_{F4} = 7$ |
| $0.90 < m_F \leq 0.95$ | $k_{F3} = 5$ |
| $0.95 < m_F < 1.00$ | $k_{F2} = 3$ |
| $m_F = 1.00$ | $k_{F1} = 2$ |

MANAGER FOR DYNAMIC COMPLEX SYSTEMS

FIELD OF THE INVENTION

The present invention relates to the management of systems which may be dynamic and complex and is particularly concerned with a system manager.

BACKGROUND OF THE INVENTION

Managed systems may be of any kind or classification or combination of kinds and classifications including, but not limited to: computer software, computer software objects, computer hardware, computer operating systems, computer applications, computer communications, computer processing, computer data storage and/or access and/or retrieval, nodal or network management systems, computer networking, neural and/or fuzzy computer implementations and/or applications, systems where the Heisenberg Uncertainty Principle must be considered (e.g., integrated circuit systems and molecular, atomic and subatomic systems and experiments), computer graphic design, communication systems employing any method or medium, electrical, mechanical, physical, chemical, manufacturing, electromechanical, electro-physical, electrochemical, economic, financial, business, accounting, organizational, biological, sociological, political, psychological, medical, experimental systems of any and all kinds, observational, data collection, expert systems, artificial intelligence systems, navigational, flight, military, surveillance, theoretical (including computer modelling), or any other such system, existing now or in the future.

An entity of a managed system is a portion, division, or constituent of the whole that is separate either in reality or in thought only. Entities of a system can be modelled as sets of a universal class of the system.

A class is a collection of members. For example, the class of software options in a particular software system is made up of all software options in the system. Thus, a particular class may be specified by either listing all of its members or by stating some condition of membership. For example, the class of software options in a particular software system may be specified either by listing all such options (e.g., by name or code number) or by stating that "all software options in the software system belong to the class of software options".

Identity of classes is identity of membership not identity of specifying conditions. It is important to note that, while class inclusion is transitive, class membership is not. For example, "options" can be considered a class of software. Individual options are members of the class "options". But, individual options, although included in the class software are not a class of software as, if an option is added, the number of classes of software does not increase.

Hierarchical relationships are required, both in reality and in Class Theory, or absurdities result in attempting entity management. Propositional calculus requires that, for every statable condition, there be a class of entities that satisfy that condition. This Principle of Comprehension can only be met, so far as is known, by placing entities to be managed in class hierarchies with the universal class U at a tier zero and sets on the other tiers. A set is a class that is itself a member of some class.

For crisp logic, set membership function values ($m_F$) are either yes ($m_F=1$) or no ($m_F=0$). For fuzzy logic, membership function values lie in a range ($0 \leq m_F 1$), with the equalities reducing fuzzy logic to crisp logic. It is important to realize that $m_F$ is not a probability value.

Entities can have diverse intrinsic natures and yet belong to the same system. For example, both hardware and software entities make up a digital computing system. Entities of entities are sets at a lower hierarchical level than simply entities. This hierarchical classification can continue for any system until the lowest tier of sets that it is reasonable or necessary to consider is reached. To simplify discussion, any system may be considered an entity, i.e., an entity which includes all other entities.

For example, a software system of a digital computer can be considered to be made up of applications. Each application in turn can be considered to be made up of code modules. Three hierarchies are to be managed here: the system, the applications and the code modules.

Managed systems comprise an assemblage or combination of entities forming a complex unitary whole, either in reality or in thought only. Any such system can be represented or modelled as a universal class which may be crisp (i.e., with precisely defined members) or fuzzy (i.e., where membership is imprecisely defined to varying degrees).

Many systems have a high degree of complexity, characterized by very complicated, intricate, or involved arrangements and interrelationships of entities on all hierarchical tiers. These arrangements and interrelationships may be difficult to understand and manage. Moreover, most systems requiring management are dynamic not static and are often vigorously active, characterized by continuous or frequent characteristic or parametric churn on all tiers. Depending upon the nature of the system, such churn can be disruptive if not properly managed. As part of the churn for some systems, sets on all tiers can appear, disappear, unite or intersect with other sets, migrate to other tiers, or acquire or lose members. Members can also have or develop imprecise membership properties, causing sets to mutate from crisp to fuzzy, taking the system class from crisp to fuzzy as well.

The management of fuzzy systems is increasing in importance in communications, for example, where diverse intravendor and intervendor product lines and products are being melded into fuzzy systems to provide "one stop shopping plug and play" capability for consumers. Systems are fuzzy when the membership functions of any of their parts or elements (entities) are indefinite to any degree.

Systems and each of their entities have fixed built-in characteristics. Characteristics are distinctive and proper activities or actions that reflect the intrinsic nature of each entity, or of the system itself. Examples of characteristics would be the inputs and outputs of an object in a class of object oriented computer software code modules.

At any given time, the characteristics of each entity (and, as noted, the system is considered an entity) are modified by parameters attributable to that entity. Parameters determine, at any given time, such things as the information content, state, or activities of an entity, but do not determine or affect the intrinsic nature of the entity. Parameters are, in general, variable.

Systems can be classified as either homogeneous or heterogeneous. Homogeneous systems consist of entities that are either all crisp or all fuzzy. Heterogeneous systems consist of a mix of crisp and fuzzy entities and thus are always fuzzy. Homogeneous fuzzy systems can be successfully managed. However, the indefinite nature of the membership function of the system can place significant restrictions on the purpose and operational effectiveness of the management capability of the system only homogeneous crisp systems can incorporate all the purposes of their tier one member sets in the overall system purpose and can thus be termed 100% generalized. If system generalization is less than 100%, as must be the case for all systems with one or more fuzzy components, the system is termed more specialized (or less efficient) as judged in relation to design intent.

Management of systems in which there is at least one fuzzy set is an increasingly frequent requirement in both industry and research. In communications, the management of catanets (concatenated networks comprising diverse products, systems and networks from different vendors and based on differing functions, protocols and technologies) is becoming an increasingly common need. It ranges from difficult to impossible to ascertain with any degree of certainty the active membership of a catanet system at any moment in time. Networks may be up or down, nodes may appear or disappear, users may come or go and applications may become active or dormant. Moreover, not all of the anticipated functionality of even active members of a catanet may be accessible at any given time. Any of these factors can turn a system from crisp to fuzzy, with the need to manage fuzzy systems even greater than the need to manage crisp systems.

Software, in general, is fuzzy, especially if not object oriented. Software can have unintentionally fuzzy characteristic, parameter, functionality and purpose sets due to various design inadequacies (bugs).

The Internet is an example of a catanet with a large software based constituency. The Internet can be considered a heterogeneous system because, from a management perspective, the membership functions of the characteristic and parameter sets of at least some entities can be fuzzy at any given time. The only practicable management system for the Internet would have to be highly specialized due to the complexity of the system itself and to the undetermined (or undeterminable) nature of the membership functions for elements of its constituent fuzzy sets of entity characteristics, parameters, functionalities and purposes.

For large, complex and almost unbounded networks (such as the Internet or most intranets) many components can be considered fuzzy, at least while they are passing through interim stages such as logon or logoff between membership and nonmembership. During logon, for example, gateway management is aware that a device is attempting to join as a full network member before the membership is confirmed by authentication procedures. Between the time that the device has made overtures to join the network and the actual acceptance of the device as a full member, its membership is fuzzy. While the device is in a fuzzy state, gateway management can initiate preparations such as an anticipatory user group assignment, virtual communications port assignments, etc. preparatory to having the device join the network as a full member. In a similar way, a device that was formerly a full member of a network, but is awaiting a software load update to bring its functionality up to the network norm, can be considered a fuzzy component as it is fairly close to full membership but is not quite there until its improved functionality software is actually functioning.

U.S. Pat. No. 5,692,106 issued Nov. 25, 1997 to Simon Towers and Paul Mellor discloses a management method and apparatus for computer system tasks and services. An example of a service may be e-mail and tasks related to this services may be installing, configuring and diagnosing and removing faults. To facilitate the carrying out of a range of different types of management tasks in a computer system, declarative models are constructed of the various services provided by the system. These models specify the requirements that need to be met for the corresponding service to be available. These requirements are set out in terms of the system entities that need to be present and the interrelationships of these entities. In addition, each management task is specified in a corresponding task program in terms of general inferencing operations that can be performed on any of the models. Execution of a particular management task involves carrying out inferencing operations on the appropriate service model in accordance with the task program for the management task under consideration.

In U.S. Pat. No. 5,471,617 issued Nov. 28, 1995 to Scott Farrand et al, A method of managing a plurality of networked manageable devices is disclosed. These networked manageable devices include at least one file server having a system board, a drive array subsystem associated with the file server and a server manager installed in the file server for monitoring the system board from a manager console using a management information base or "MIB". First, second and third pluralities of objects which describe the system board, the drive array subsystem and the server manager, respectively, are collected and assembled into a MIB. The assembled MIB is then used to manage the file server.

In U.S. Pat. No. 5,651,006 issued Jul. 22, 1997 to Shuji Fujino et al, a hierarchical communication network management system comprises a plurality of agents and sub-managers connected to lower communication networks and an integration manager connected to a higher communication network. Each of the sub-managers functions as an agent to the integration manager and functions as a manager to each agent, so that it becomes possible to employ Simple Network Management Protocol (SNMP) between each agent and its sub-manager and between a sub-manager and the integration manager. Information is collected by managers and stored in a management information base or "MIB".

Unfortunately, the above managers are limited in scope, either to a computer system or to a plurality of networked devices.

SUMMARY OF THE INVENTION

The system manager of the subject invention has a table associating each element in the system with a number representing a management scheme. This number is a product of management kernels taking the form $S=\Pi k_i^n$, where $k_i^n$ is a management kernel with k being a prime number and n a positive integer. From S, each k and n may be extracted. These values are used with a second table that maps the values to management functions.

In accordance with an aspect of the present invention there is provided a method for facilitating management of an electrical, electronic, electro-mechanical or computer system comprising receiving at an electronic manager a plurality of management rules and associated management kernels, each management kernel including a prime number factor raised to a positive integer power.

In accordance with another aspect of the present invention there is provided a method of managing an electrical, electronic, electro-mechanical or computer system including receiving a plurality of management rules and associated management kernels, each management kernel comprising a prime number factor raised to a positive integer power. The factor. Also provided is a computer readable medium for providing program control for a manager of a system for carrying out this method.

In accordance with a further aspect of the present invention there is provided an electronic manager for an electrical, electronic, electro-mechanical or computer system comprising: a directive acceptance and result reporting layer for receiving an indicator of each managed entity in the system and an associated control parameter, a manager instructions and rules of operation layer, a management kernel definition and redefinition layer which, together with the manager instruction and rules layer, has management kernels and associated management rules, each management kernel comprising a prime number factor raised to a positive integer power, a mathematical manipulation layer for dividing each control parameter by ones of the management kernels; a system entity information management layer responsive to the manager instructions and rules of operation layer, the management kernel definition and redefinition layer and the mathematical manipulation layer for deriving management rules; and a management plane communications capability layer responsive to the system entity information management layer for managing the system.

BRIEF DESCRIPTION OF THE DRAWINGS

In the figures which illustrate an example embodiment of this invention.

DETAILED DESCRIPTION OF THE PREFERRED EMBODIMENTS

The function of system management is to control the activities of system entities and of the system itself so that both entities and system can fulfill their respective purposes. The invention achieves this via a simple algorithm that maps hierarchical systems to what may be considered a flat (i.e., nonhierarchical) management plane. Entity and system activities are manipulated by the manager on the management plane via their characteristics and parameters and management instructions from a Management Intelligence Source (MIS). Once manipulation is complete, management directives flow back from the manager to the system to control and give direction to the system and entity activities. Due to the nature and simplicity of the algorithm, ongoing iterative corrections and adjustments can be made by the manager "on the fly". This permits most types of systems to be managed, including those that are fuzzy and extremely dynamic. The management of very complicated and extensive systems can be accommodated via management hierarchies.

Figure 1:
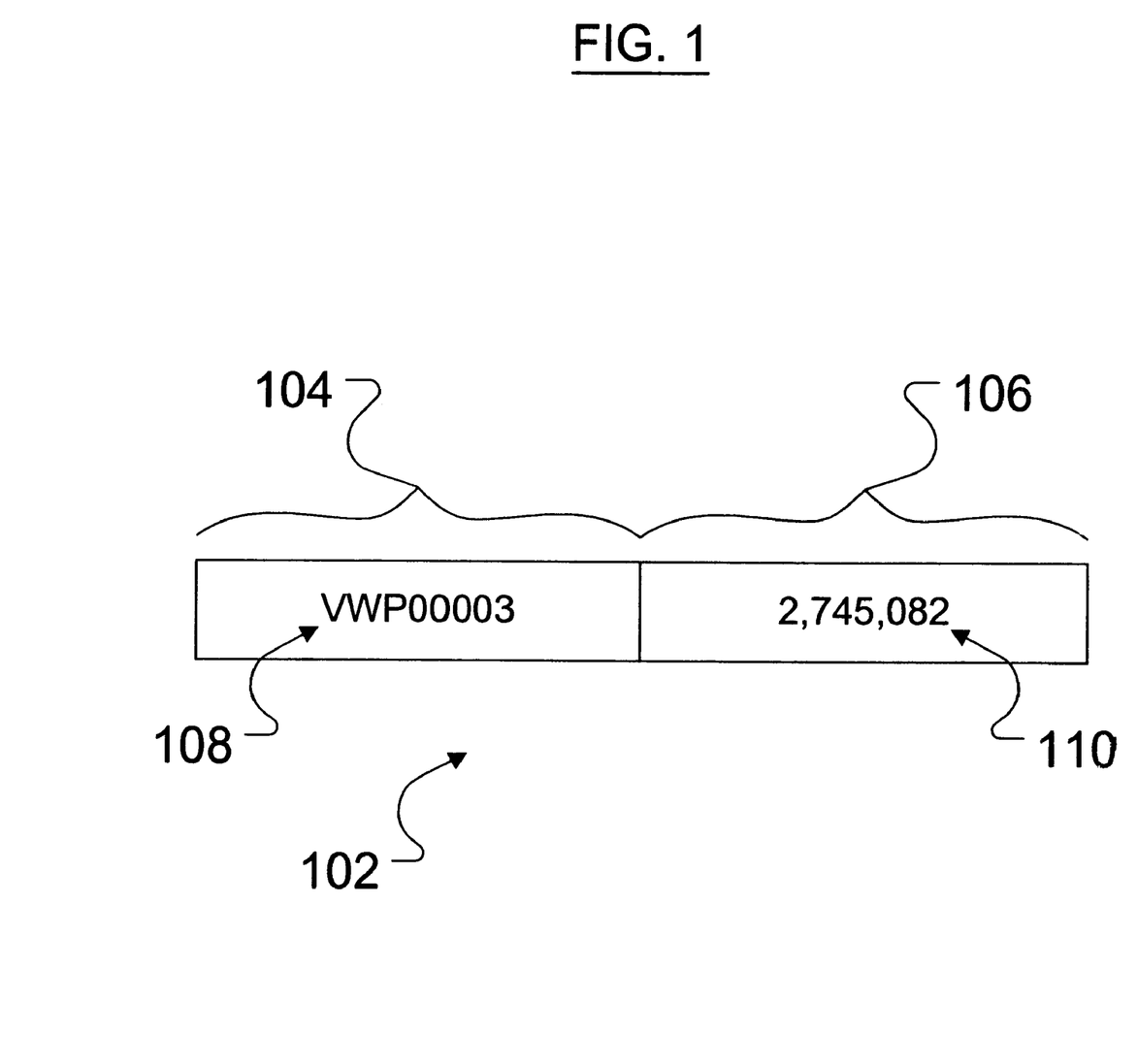
FIG. 1 illustrates a Control Parameter in accordance with an embodiment of the invention.

With reference to FIG. 1, the manager requires that, regardless of tier, every entity of a system to be managed have a Control Parameter 102 comprising a unique Code Number C 108 in an Identifier Field 104 and a Management Scheme S 110 in a Management Field 106. It is not necessary that Code Number 108 be part of a single numbering scheme, only that it be unique. If Code Number 108 is not unique, then the manager requires that it be unique on the tier occupied and that the tier then be identified to the manager. Identifier Field 104 is a binary digit field long enough to accommodate any Code Number 108 used. Associated with each Identifier Field 104 is a Management Field 106. Management Field 106 is a binary digit field of sufficient length to accommodate Management Scheme 110. Management Scheme 110 embodies the essence of a plan or program of action to be followed by the manager and the system under differing management conditions. Management Scheme 110 is a positive integer number greater than zero that defaults to one if unassigned. Management Scheme 110 is comprised of a product of management kernels ($k_i^n$), $S = \Pi k_i^n$.

Management kernels ($k_i^n$) are the core of Management Scheme 110. Implicit in $k_i^n$ is the information needed to inform the manager of characteristics and/or parameters and/or functions of each entity, as well as the information required by the manager to manipulate, associate and dissociate, reconfigure, communicate with and control entities on all tiers and to assign subsystem management hierarchies. To meet algorithm requirements, each $k_i$ must be drawn only from the set of integer prime numbers raised to positive integer powers n. This enables all $k_i^n$ (except for $k_i^0$, which is "1") to be unequivocally and simply extracted from Management Scheme S 110 at any time or place and thus enables effective, versatile and dynamic management and management communications between the manager and the system together with all its entities.

The set of the first 303 prime numbers drawn from the integers zero through 2000, in combination with the integer one, is sufficient to assign $k_i$ for most dynamic complex systems. The numerical distribution of the first 303 prime integers is such that a relatively large number of integer primes exist with low numbers of decimal digits. Low numbers of decimal digits in the $k_i$ are important to keep the maximum number of binary digits in Management Scheme 110 to a minimum for any given system, both to reduce the length, L, of Management Field 106 and to ease the real-time computational requirements on the manager if the manager is designed to employ ongoing real-time computational, as opposed to tabular look up, management. Either methodology can be used, depending on design choices made in response to how dynamic and complex the system is.

Figure 2:
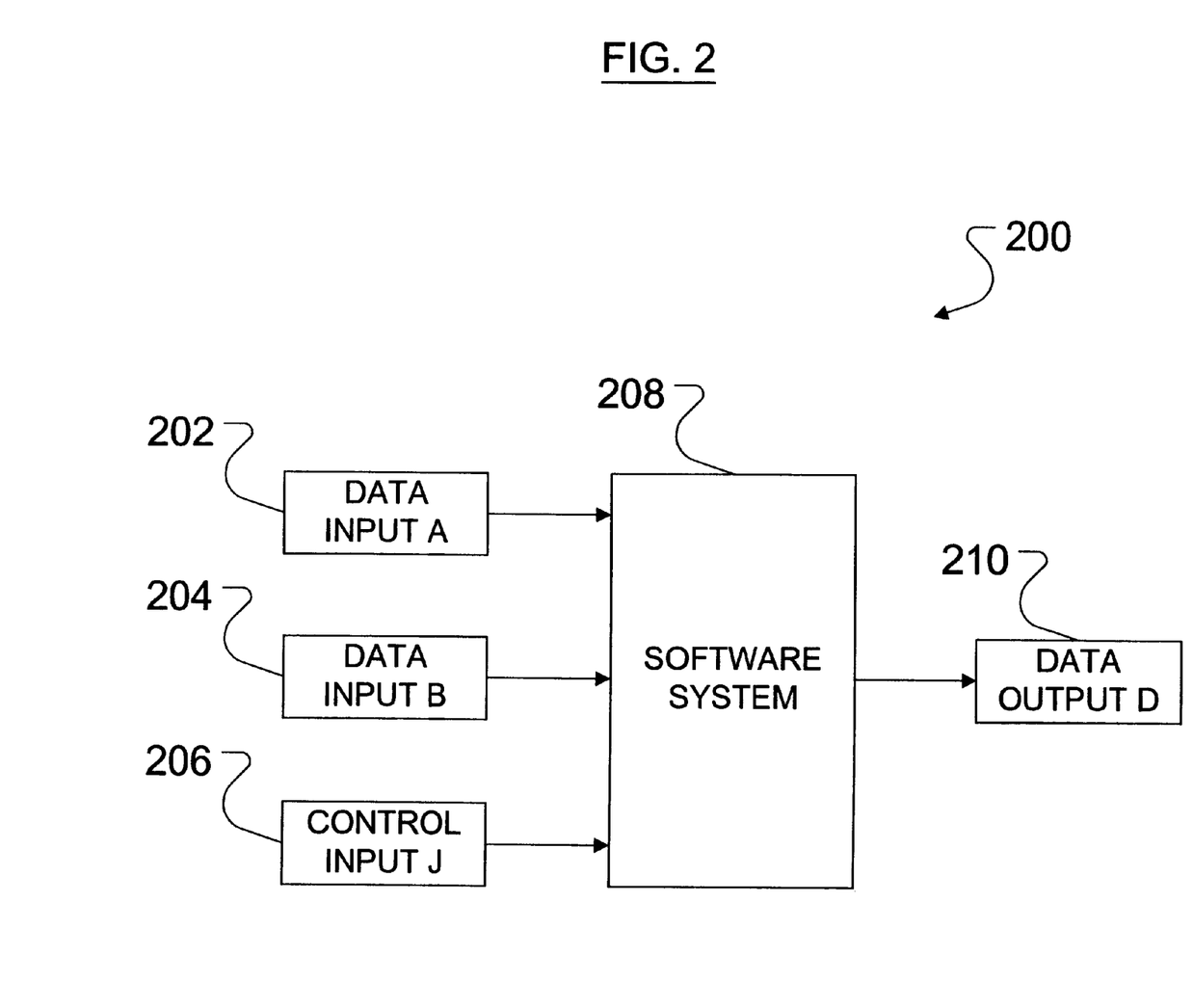
FIG. 2 illustrates, as a block diagram, software system.

Although the manager is designed to deal with dynamic complex systems, an example system so simple it can easily be managed by other means is useful to illustrate how the manager works and to show the potential of the manager for managing much more complex systems. Referencing FIG. 2, a software system 200 is assembled to perform some simple arithmetic operations. A system 208 has three inputs 202, 204, 206 and one output 210. As shown in FIG. 2, inputs A 202 and B 204 and output D 210 are for data and input J 206 is for control.

At a given time, data input values are "a" at input A 202 and "b" at input B 204. a and b are always positive. Control input signal "j" at J 206 can be one of <0, 0, or >0. With j=0, output "d" at D 210 is the sum of the input values a+b. If j<0, output d at D 210 is the absolute value of the difference a−b. If j>0, output d at D 210 is the product of a×b.

Figure 3:
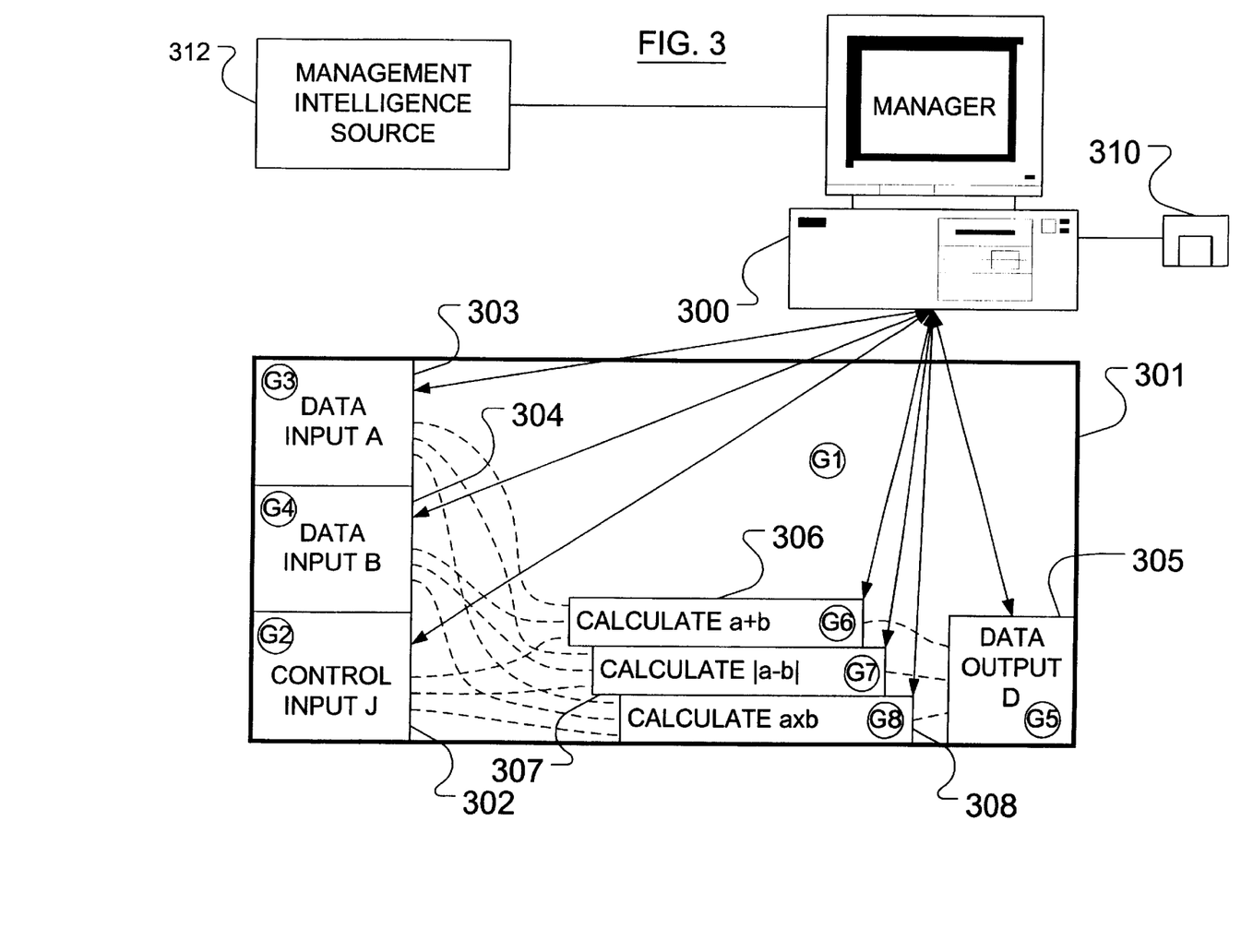
FIG. 3 illustrates a simplified view of the system in FIG. 2.

A simplified view of the entities of system 200 is shown in FIG. 3. Each entity of the system, and the system itself, is given a Code Number, from G1 to G8, known to a manager 300. Manager 300 may be a computer loaded with system management software for executing the method of this invention from software medium 310, which could be a disk, a tape, a chip or a random access memory containing a file downloaded from a remote source. From the Code Number C and associated Management Scheme S manager 300 can identify each entity and the system itself, together with entity or system characteristics, parameters and functions and can manage the system based on this information. Systems that are much more complex than this trivial example can be managed just as easily.

Manager 300 receives from a Management Intelligence Source 312 the purpose of the system. In the case of negative control input 302, the purpose is to find the absolute value of the difference of data inputs 303, 304 and send the absolute value of the difference to output 305. A zero control input 302 requires that manager 300 find a sum of data inputs 303, 304 and send the sum to output 305. A product of two data inputs 303, 304 is sent to output 305 as a result of a positive control input 302.

Manager 300 also receives from the Management Intelligence Source the table 402 (FIG. 4) dealing with the system 200 inputs 202, 204, 206 and the system output 210 as well as with the interpretation of the signals received via such inputs 202, 204, 206, and provided by the system 200 to such output 210. Thus, if a distinctive management kernel of numerical value the integer prime "5" is assigned to inputs 202, 204, 206, a prime number value for the management kernel 30 need not be assigned to the output 210. The numerical value for the management kernel assigned to output 210 can then default (for simplicity) to the numerical value "1". Similarly, if a distinctive management kernel of numerical value the integer prime "3" is assigned to the data inputs 202 and 204 a prime number value for the management kernel need not be assigned to the control input 206. The numerical value for the management kernel assigned to control input 206 can also default (for simplicity) to the numerical value "1". The parameter values in this simple example system 200 at the control input 206 must be differentiated in the FIG. 4 table 402 and are assigned the management kernels: "2" for a negative parameter value; "$2^2$" for a zero parameter value and "$2^3$" for a positive parameter value. The resultant numbers 5,3,1,2,4, and 8 are termed "management kernels" or "kernels" for the system.

Figure 4:
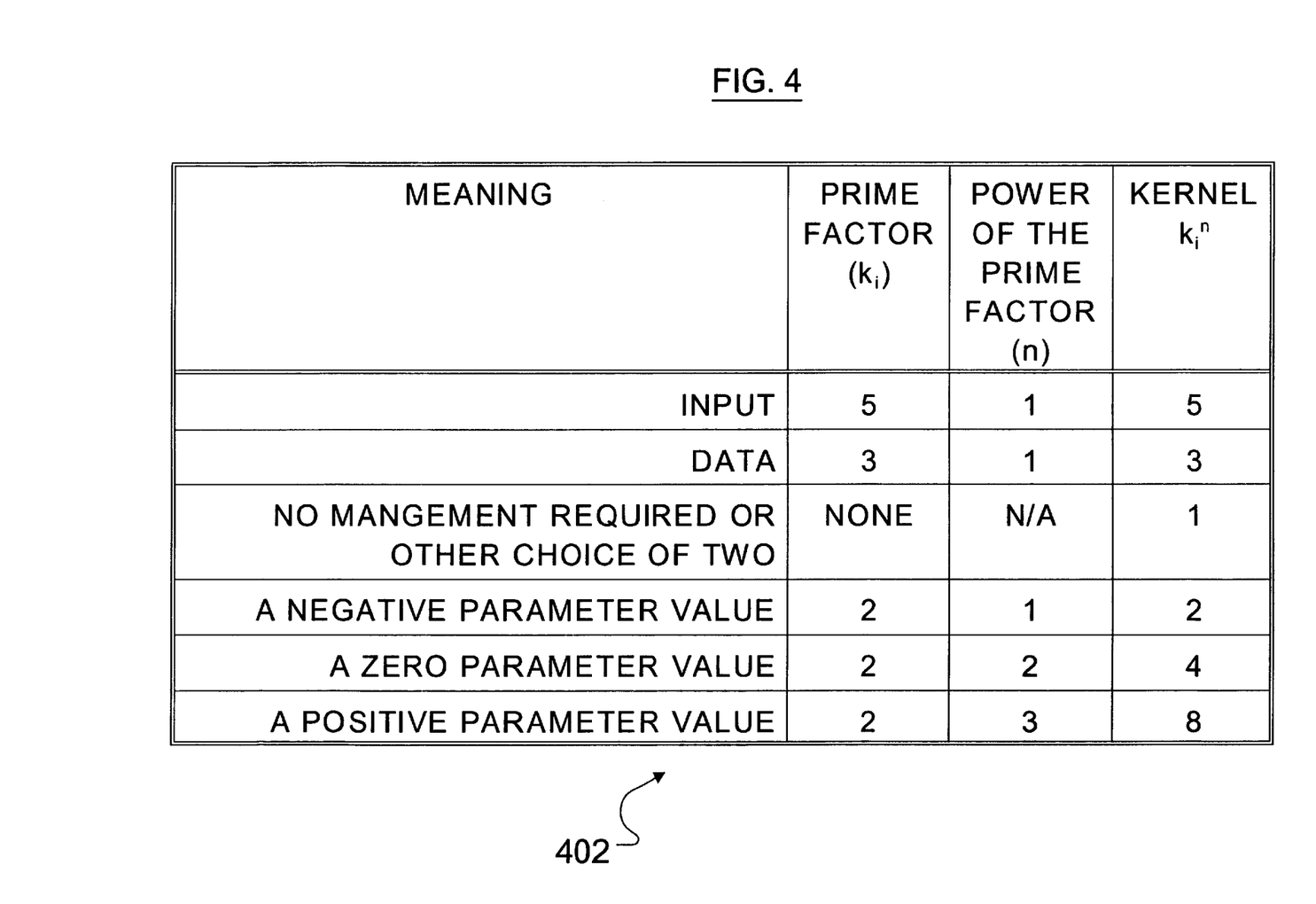
FIG. 4 illustrates a table in which management kernels are associated with their meaning in accordance with an embodiment of the present invention.

The FIG. 4 table, in conjunction with the purpose of the system, provides an association of each kernel with a management rule.

Figure 5:
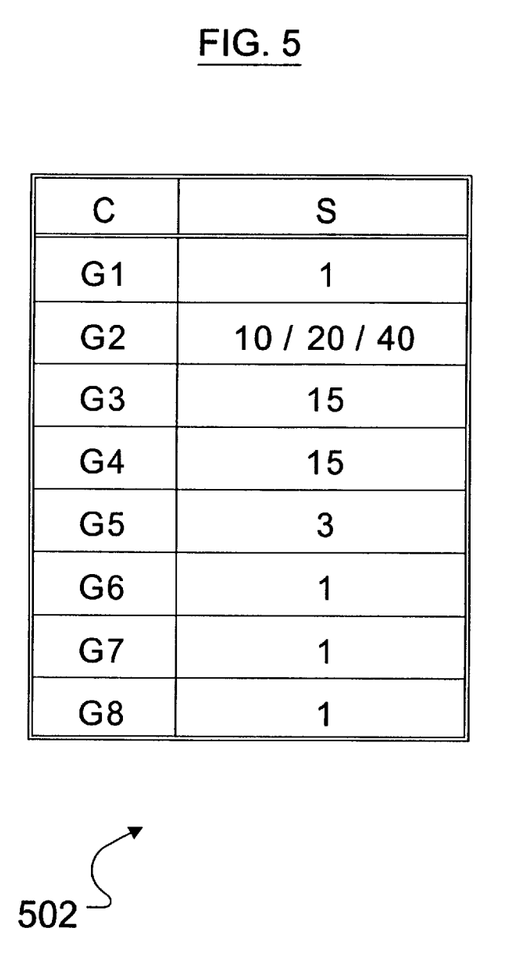
FIG. 5 illustrates a table in which Management Schemes are calculated in accordance with an embodiment of the present invention.

A table 502 (FIG. 5) is then loaded by Management Intelligence Source 312 into manager 300, equating each Code Number, C, to one management scheme, S. It is contemplated that this table may change for each system operation. In the present example, for any given system operation, G2 has one of three values; for illustration purposes all three possible values for G2 are shown in FIG. 5.

Beyond tables 402 and 502 and the purpose of the system, manager 300 knows nothing else about the system and has to control the system from what it knows.

Figure 6:
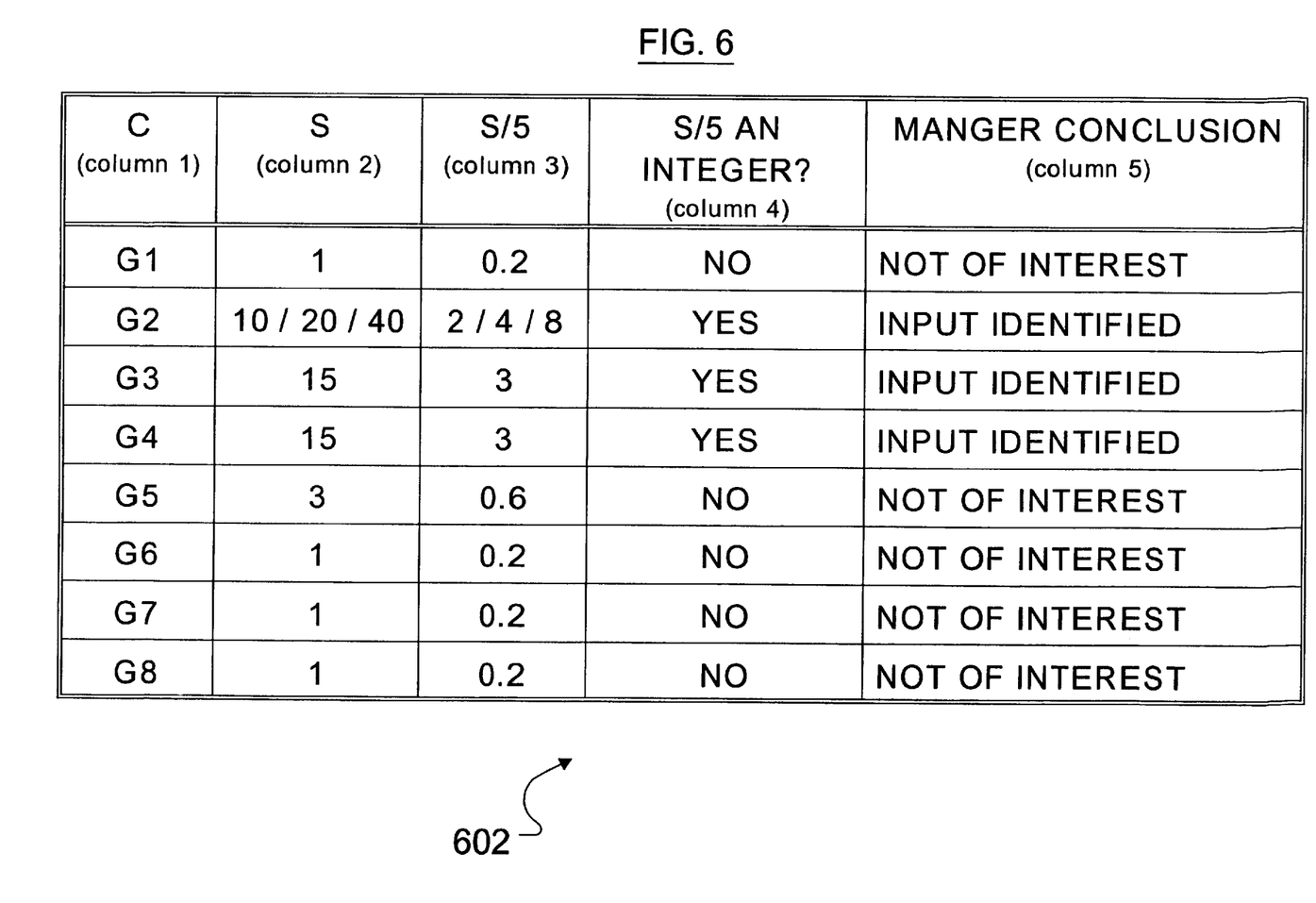
FIG. 6 illustrates a table in which inputs are identified in accordance with an embodiment of the present invention.

Manager 300 remains idle until it is prompted (typically by receiving a new table 502, or a new entry in table 502, from Management Intelligence Source 312) that system 301 requires an operation. Precisely what operation, manager 300 does not yet know. Upon receiving a prompt, manager 300 knows it needs to find system inputs and from table 402 it notes that inputs are identified by management kernel "5". Therefore, all of the S values in table 502 (FIG. 5) are divided by management kernel "5", with the result shown in table 602 (FIG. 6). Manager 300 identifies as input entities whose result of the division are integers in column 3 of table 602 (FIG. 6).

Figure 7:
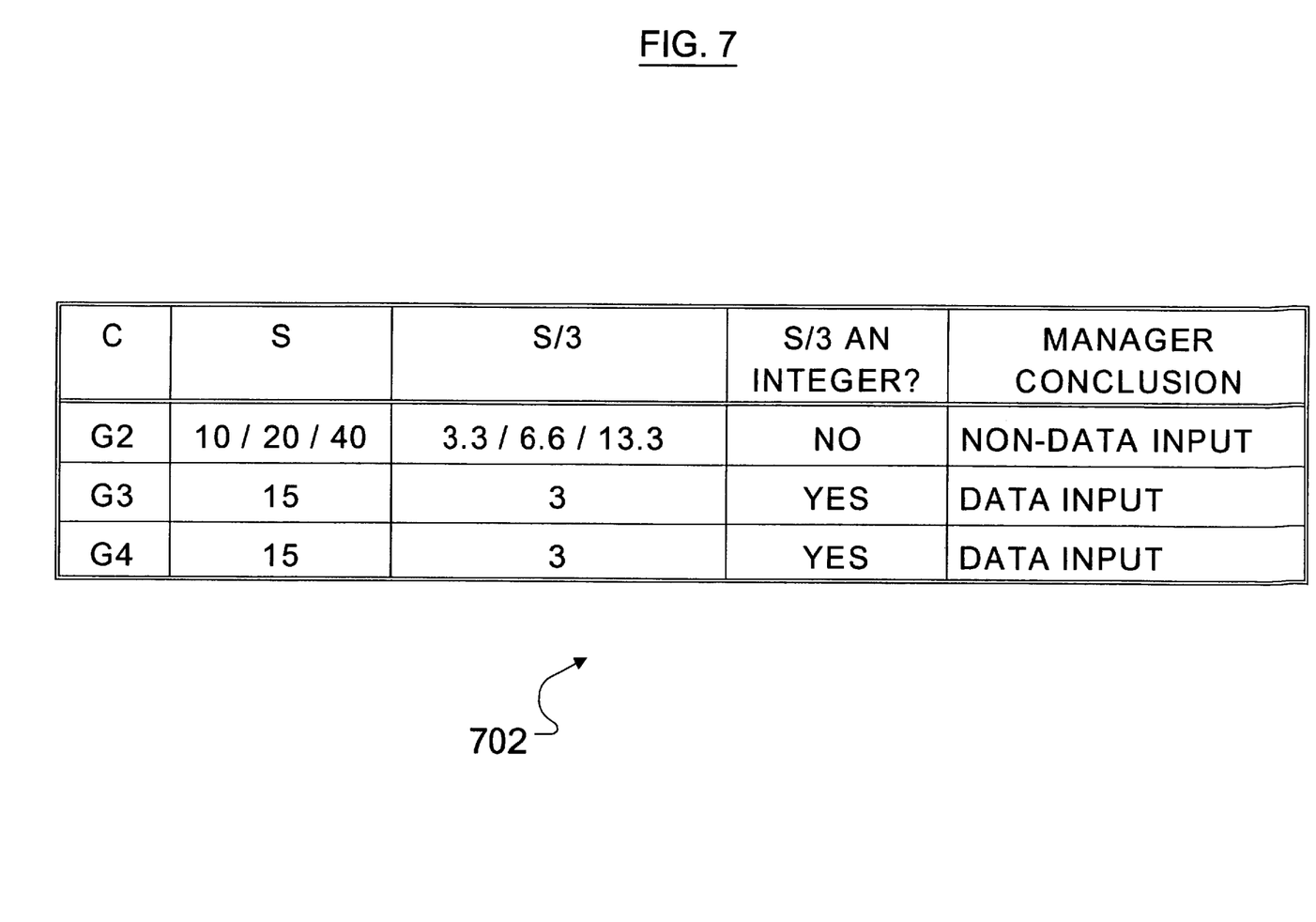
FIG. 7 illustrates a table in which data input is identified in accordance with an embodiment of the present invention.

Next, to distinguish between data inputs and control inputs, manager 300 divides S for the inputs identified in table 602 (FIG. 6) by management kernel "3" associated with "data" in table 402 (FIG. 4). The results of this division are shown in table 702 (FIG. 7), where a noninteger value in column 3 indicates an entity that is a control input. In this way, manager 300 identifies entity G2 as the only entity providing a control input.

Figure 8:
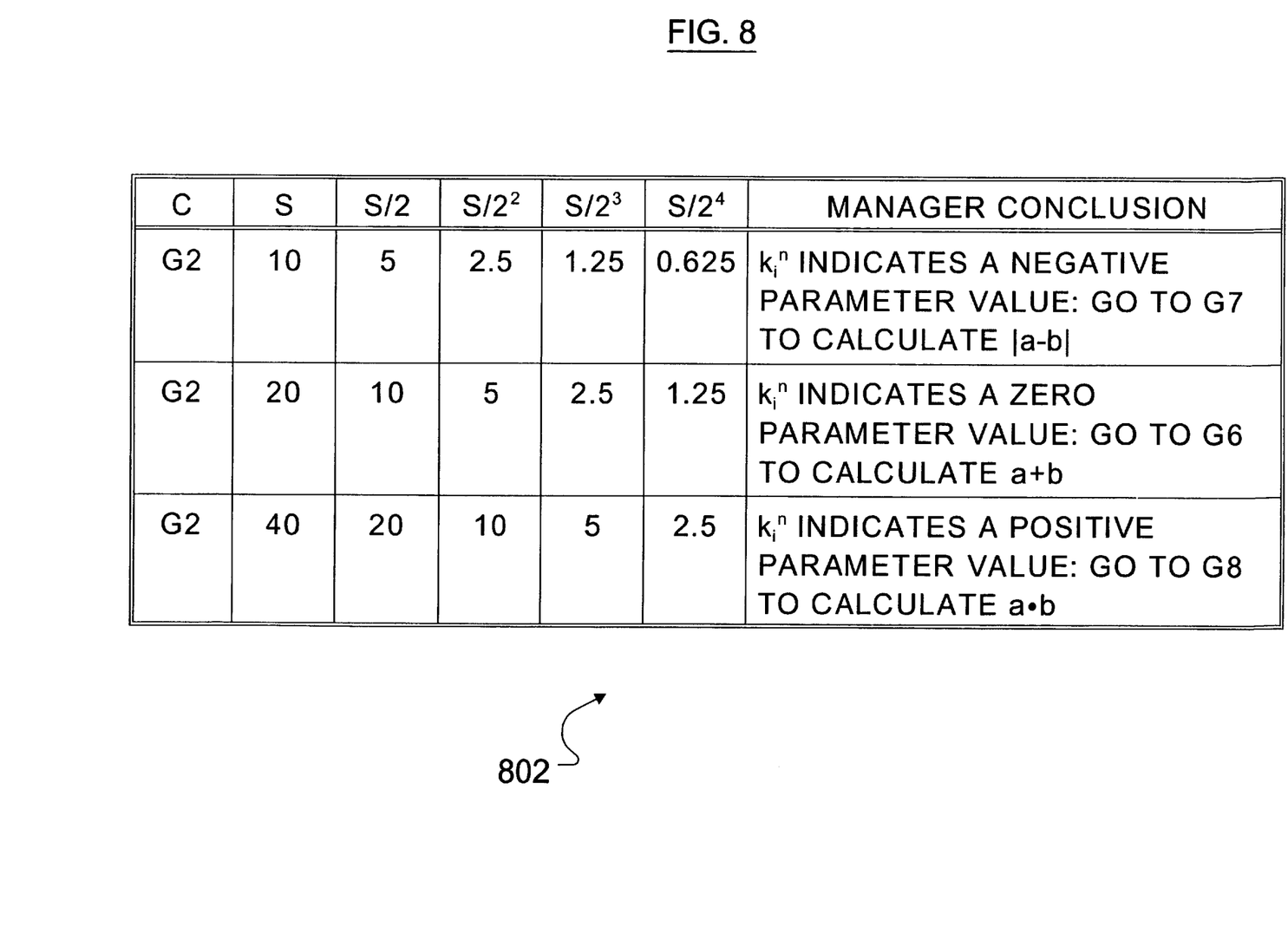
FIG. 8 illustrates a table in which control input is interpreted in accordance with an embodiment of the present invention.

Having identified G2 as providing a control input, manager 300 next needs to determine what type of control input G2 is generating. From the purpose known by manager 300, this control input may be negative, zero or positive. Table 402 (FIG. 4) is consulted which indicates that the prime number "2" is used with a power to create different management kernels: $2^1=2$; $2^2=4$; $2^3=8$, to differentiate these three control levels. Manager 300 repeatedly divides the S value for entity G2 by the management kernel "2" until the dividend is determined to be nonintegral. The division result preceding the noninteger indicates the power of 2 and, therefore, the control value (see the FIG. 8 table 802).

Note that, where a choice of only two possible characteristics or parameters exists, a management kernel not equal to one need be assigned to only one of these characteristics or parameters, but not to both. In this example, there are only two kinds of inputs in the system, control inputs and data inputs. The management kernel "3" is assigned, by Management Intelligence Source 312 via table 402 (FIG. 4), to data and "1" is assigned to control because any input (indicated by management kernel "5") without a management kernel "3" (the data designator) assigned as well, must be a control input. The strategy of using a $k_i^0=1$ designator for one choice from two possibilities is recommended in general to both reduce the number of operations required for system management and to reduce the length L of Management Field 106 (FIG. 1) to a minimum. Note also that, in general and for computational expediency, management kernels are best chosen from the set $k_i^n$, with n=1 (and with the additional use of $k_i^0=1$): the choice of n>1 in this example is to illustrate alternative design choices that may suit certain implementations.

This method of identifying characteristics and parameters can be extended to dynamic systems whose inputs, or other entity characteristics or parameters, come and go rapidly and continuously. The method can also be applied to fuzzy systems where the closeness to presence or absence of a characteristic or parameter is indefinite to some extent as defined by the membership function of that characteristic or entity.

If a system to be managed has included an entity which in turn has an associated numeric parameter ($N_p$) requiring management, the numeric parameter may be included as a factor in the management scheme for the system. If more than one entity has an associated numeric parameter, the numeric parameters of each such entity can be included in a subsystem via assignment of a unique hierarchy of subsystem identifiers, $k_{u1}^n$, $k_{u2}^n$, $k_{u3}^n$, . . . , to the management scheme for these entities.

In either case, if the largest possible value of "S" in the system ("$S_{max}$") and the largest possible value of $N_p$ in the system ("$N_{p\ max}$") are such that $S_{max} \times (N_{p\ max})^2 <$about $1 \times 10^{100}$, each numeric parameter value, $N_p$, required can then be stored in Management Scheme S of the system or subsystem, in addition to any required $k_i^n$, using the following protocol: If $N_p$ values must be included in S as a factor, then $N_p$ must first be squared so as to render it unambiguously extractable by the manager, $S=(\Pi k_i^n) \times N_p^2$ with n now restricted to either "0" or "1". For example, if the kernels for a particular entity in a system or sub-system are 2, 3 and 5 (with 7 an unused but valid kernel), if values of n other than "0" or "1" are permitted, and if $N_p=14$ is to be included in S as is, i.e., $S=\Pi k_i^n \times N_p$. S becomes, in this example: $S=(2 \times 3 \times 5) \times 14=420$. Extracting management kernels, the manager computes: $420=2 \times 2 \times 3 \times 5 \times 7$ and incorrectly concludes that: $k_i^n=(1,)2,3,5,7$ resulting in the loss of the numerical value of $N_p$. But if, in the same example, n is restricted to either "0" or "1" and $N_p$ is entered in S as: $N_p^2=14^2=196$, S becomes: $S=(2 \times 3 \times 5) \times 196=5,880$. Extracting management kernels, the manager computes:

$$5,880=2^3 \times 3 \times 5 \times 7^2$$

$$5,880=(2 \times 3 \times 5) \times (2 \times 7)^2=(2 \times 3 \times 5) \times 196$$

Taking the square root of $N_p^2=196$, the manager correctly interprets the management kernels as 2, 3, 5 and the numeric parameter value as $\sqrt{196}=14$.

The use of subsystems to store numeric parameters removes the restriction on the value of n for $k_i^n$ which would otherwise be imposed. By confining numeric parameters to numeric subsystems, n may then be a positive integer greater than or equal to zero outside of any subsystem defined to store numeric parameters. In numeric subsystems themselves, at the bottom of the hierarchy of subsystem sets (i.e. the jth set, wherein the $N_p$ values themselves are stored), the n in $k_i^n$ must be a positive integer equal to zero or one only. Very complicated systems may be subdivided into any type (or types) of subsystems to simplify management as well as to store numeric parameters.

Additionally, use of a unique numeric subsystem hierarchy identifier kernel, $k_{ui}^n$, allows for reuse of primes for kernels within a particular subsystem hierarchy which leads to more compact management schemes.

If a system is fuzzy, the values of the membership functions ($m_F$) for the system or components lie in the range $0 \leq m_F \leq 1$; the two extreme membership function values $m_F=1$ (a member) and $m_F=0$ (not a member) reduce fuzzy logic to crisp logic.

Figure 9:
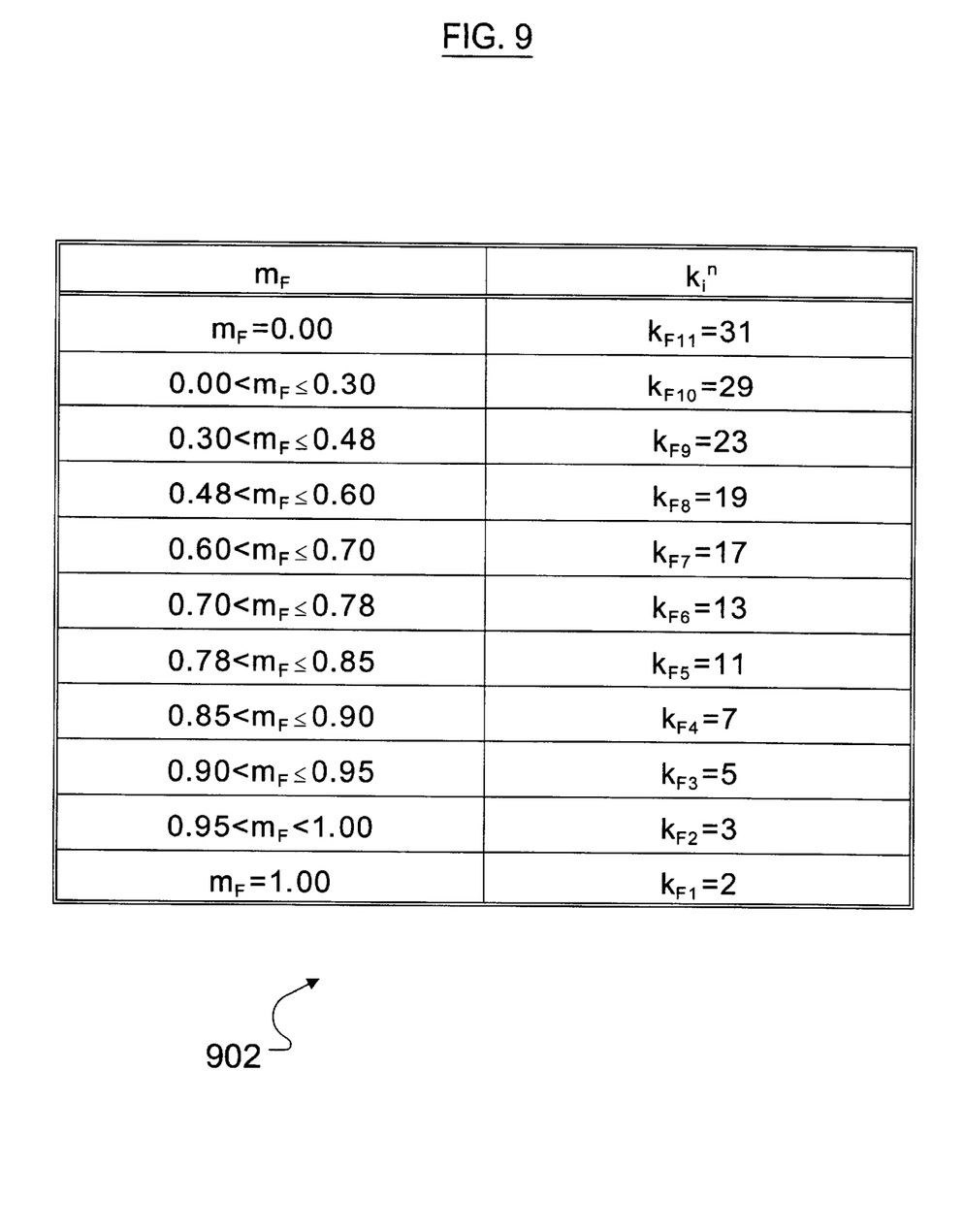
FIG. 9 illustrates a management table in accordance with an embodiment of the invention.

A suggested management table 902 (with assigned management kernels, $k_i^n$, aligned with appropriate management rules such as "prepare for the entity's imminent full membership at $m_F=0.95$ and increasing") is shown in FIG. 9. Fuzzy entities are assigned to a fuzzy set or sets, pointed to by appropriate $k_i^n$.

Figure 10:
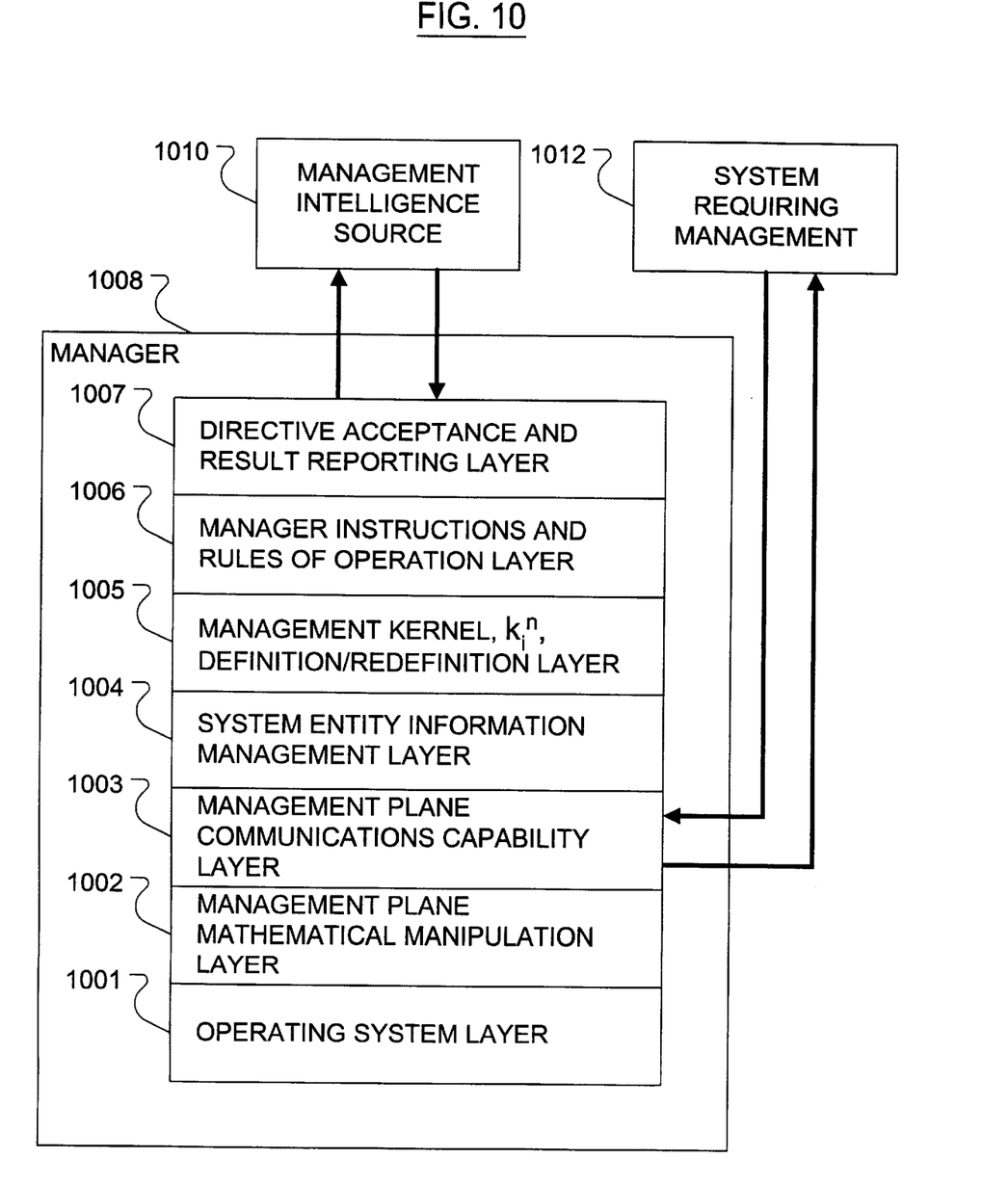
FIG. 10 illustrates, as a block diagram, a management system in accordance with an embodiment of the invention.

The manager of this invention may be modelled a layered architecture device as shown in FIG. 10. Inputs and outputs to manager 1008 occur at layers 1007 and 1003. The layers are as follows. Adjacent layers intercommunicate via the minimum number of interfaces practicable, with services being requested by the uppermost layer and services being provided by the lowermost layer of each adjacent layer pair.
DIRECTIVE ACCEPTANCE AND RESULT REPORTING LAYER 1007

Input to layer 1007 is from Management Intelligence Source 1010, which may be considered, for our purposes, a de facto layer "0" above layer "1" in FIG. 10. Management Intelligence Source 1010 is a resource (human or otherwise) capable of and authorized to issue directives to manager 1008 concerning system management. Such directives must reflect a high degree of understanding of how the system is to be configured and run. Management Intelligence Source directives provide sufficient input to manager 1008 to permit it to control any system under consideration.

Output from layer 1007 is in the form of reports from manager 1008 back to Management Intelligence Source 1010 as Management Intelligence Source 1010 may require. Layer 1007 is otherwise concerned with accepting and interpreting the directives from Management Intelligence Source 1010 and with putting these directives into effect via Manager Instructions and Rules of Operation of layer 1006. An example of layer 1007 activities might be a directive by Management Intelligence Source 1010 to send a result of an operation performed on the values at inputs A and B to output D in the forgoing example (200, FIG. 2). Manager 1008 would follow the Management Intelligence Source Directive and report back to Management Intelligence Source 1010 on the success (or otherwise) of managed system 1012 in carrying out Management Intelligence Source instructions.
MANAGER INSTRUCTIONS AND RULES OF OPERATION LAYER 1006

Layer 1006 deals with those manager instructions and rules of operation analogous to, but generally much simpler than, the instructions that must be provided to an expert system to permit it to function. In the forgoing example, these would be the association of specific operations with values at control input J (206, FIG. 2).
MANAGEMENT KERNEL, $k_i^n$, DEFINITION/REDEFINITION LAYER 1005

$k_i^n$ are the messaging agents used to carry out the instructions from the manager to the system and must be carefully defined in exact synchronicity with layer 1006 instructions and rules of operation provided to manager 1008 by Management Intelligence Source 1010. In the foregoing example, this layer would be concerned with the precise instructions to the system as to the operations to perform on the inputs. FIG. 4 illustrates an association of kernels with instructions and rules of operation for the exemplary system.
SYSTEM ENTITY INFORMATION MANAGEMENT LAYER 1004

Layer 1004 deals with information access, storage and retrieval as it pertains to entities in system 1012. With reference to FIG. 1, for each entity to be managed, information is stored in a Control Parameter 102 as an Identifier Field 104 containing the Code Number C 108 together with an associated Management Field 106 containing the Management Scheme S 110. In the simplified exemplary system this layer represents a complete set of characteristics and parameters for inputs, outputs and operations. FIG. 5 illustrates a Code Number and Management Scheme associated with each entity in the exemplary system.
MANAGEMENT PLANE COMMUNICATIONS CAPABILITY LAYER 1003

Via Layer 1003, coded information to manage system 1012 is distributed to the system by manager 1008 while iterative feedback is passed back to manager 1008 from system 1012. Communications between manager 1008 and system 1012 may be via any useful communications protocol, such as SNMP in a datacommunications context. In the simplified exemplary system of FIG. 3, such intercommunication between the manager 300 and the system 301 is represented by the double-ended arrows joining each of the system's active parts G2, G3, . . . , G8 (302, 303, . . . , 308) with the manager 300.

MANAGEMENT PLANE MATHEMATICAL MANIPULATION LAYER 1002

Layer 1002 is a decoding and encoding layer. At layer 1002, mathematical operations take place to extract to encode the management kernels, $k_i^n$, and any numeric parameters $N_p$ from the management scheme assigned to each code number.

OPERATING SYSTEM LAYER 1001

Layer 1001 is a basic operating system for manager 1008.

Figure 11:
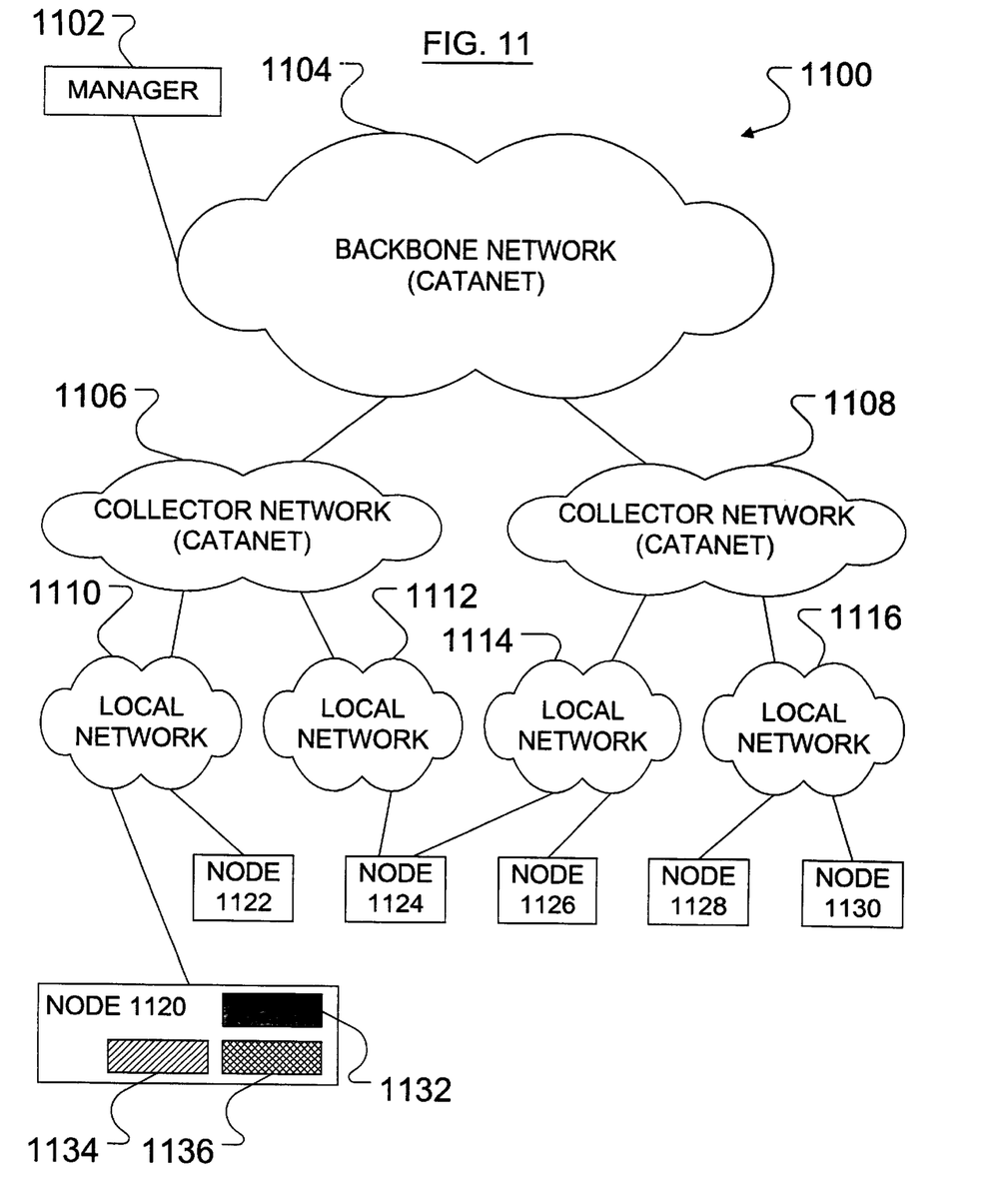
FIG. 11 illustrates, as a block diagram, a communications network.

Systems may be subdivided, in reality or in thought only, into subsystems to enable management of very complicated and/or extensive systems or to accommodate systems where numeric parameter values are assigned to entities included in the system. Referring to the telecommunications example of FIG. 11, a manager 1102 in a complicated system, such as a backbone network 1104, can manage more effectively and more efficiently if the member collector networks 1106, 1108, included local networks 1110, 1112, 1114, 1116 and nodes 1120, 1122, 1124, 1126, 1128, 1130 are each treated as subsystems of the backbone network system 1100. As is known from, or is implicit in, Class Theory, hierarchical relationships are essential amongst the system entities to be managed or management is impossible.

Returning now to FIG. 10, no system of any significant complexity can be managed unless that system is hierarchical. This hierarchical structure, however, is implicit in the $k_i^n$ and S values manipulated by the manager on the Management Plane (Management Plane Communications Capacity Layer 1003 and Management Plane Mathematical Manipulation Layer 1002).

General Rule #1 for Managers
Entities on Higher Tiers May Request Services From Appropriate Entities on Lower Tiers.

Tier management loosely follows one of the basic tenets of the Open Systems Interconnection (OSI) Model. OSI is a reference model for the layering of common functions in a telecommunications system. In the OSI Model, higher layers request services of immediately adjacent lower layers and lower layers provide services to the immediately adjacent higher layers. As few interfaces as possible are provided between layers.

General Rule #2 for Managers
Entities on Lower Tiers Must Provide Services to Those Appropriate Entities on Higher Tiers from Which Such Services were Requested.

A notable exception to this rule involves service requests sent directly by the manager 1008 to a layer (1007 through 1001 inclusive), with the requested services provided directly back to the manager 1008. Moreover, instructions given to the manager by the Management Intelligence Source (layer 1007) may permit entities to exchange services beyond the scope of the mandate of the manager.

General Rule #3 for Managers
Messaging Agents between Entities are the Management Kernels. $k_i^n$, Embedded in the Management Scheme, S.

On Management Intelligence Source instructions (captured in layer 1006), the management kernels are assigned and defined in layer 1005. The management kernels, as embedded in the management scheme S by the manager, then serve as the messaging agents between the manager 1008 and all entities in the managed system. The Code Number, C, and S make up the manager view of each system entity. Encoded in S are the $k_i^n$ which permit the manager to construct or reconfigure the system in accordance with Management Intelligence Source directives and from iterative feedback (if any) provided by the system entities.

General Rule #4 for Managers
Parameter Values cannot Violate Characteristics.

Independent of the nature of the system being managed, this rule is embedded in the Manager Instructions and Rules of Operation at layer 1006 and cannot be violated. Characteristics are distinctive activities or actions that reflect the inherent nature of each entity. The characteristics of each entity are modified by parameters attributable to that entity. Parameters determine, at any given time, such things as the information content, state, or activities of an entity. Characteristics cannot be perverted by the form, configuration or the function of an entity else the entity will not work as per design intent.

A characteristic of an entity may be a one litre capacity. A parameter corresponding to this characteristic may be the volume currently held in the entity. To restate General Rule #4 in relation to this example, one cannot hold two litres of water in a one litre container.

General Rule #5 for Managers
Class or Set Characteristics cannot Violate the Characteristics of their Members or Included Sets or Entities.

Violation of this rule will lead to absurdities. A machine resulting from an assembly of automobile parts cannot be expected to fly.

General Rule #6 for Managers
Class or Set Parameters cannot Violate the Parameters of their Members or Included Sets or Entities.

If the angular velocity of the drive wheels on a car is set to propel the car at 40 mph, the car itself cannot be expected to run at 60 mph. Parametric consistency is essential, both technically and commercially, to the proper operation of a system.

Although keeping resultant management schemes compact, the practice of associating a kernel with a value of "1" to represent an instruction or rule of operation other than that represented by a prime need not be followed. Instead, each distinct instruction or rule of operation may be associated with a kernel which is a distinct prime number.

For subsystems which do not have numeric parameters, while kernels may be represented by $k_i^n$ (with n being a positive integer), n may ideally be set at "1" for all kernels making the set of $k_i^n$ more homogeneous and (arguably) easier to process and interpret.

It will be appreciated by a person skilled in the art that the Code Number may be a number, a word, an alphanumeric or any other marker used to uniquely identify an entity.

Other modifications will be apparent to those skilled in the art and, therefore, the invention is defined in the claims.

What is claimed is:

1. A method for facilitating management of an electrical, electronic, electro-mechanical or computer system comprising receiving at an electronic manager a plurality of management rules and associated management kernels each management kernel comprising a prime number factor raised to a positive integer power.

2. The method of claim 1 wherein, for each said kernel, said positive integer power has a value of one.

3. The method of claim 1 wherein, for at least one said kernel, said positive integer power has a value greater than one.

4. The method of claim 1 further comprising receiving a code number identifying each managed entity of said system.

5. The method of claim 4 further comprising receiving a management scheme associated with said each code number, said management scheme comprising a product of a plurality of said management kernels.

6. The method of claim 5 wherein, for each said kernel, said positive integer power has a value of one and said management scheme further comprises a squared numeric parameter as a factor in said product of said management kernels.

7. The method of claim 5 wherein at least one of said management rules is a subsystem indicator having an associated unique subsystem identifier kernel and wherein said management scheme includes said unique subsystem identifier kernel.

8. The method of claim 7 wherein, for each kernel included in said management scheme having said unique subsystem identifier kernel, said positive integer power has a value of one and wherein said management scheme further comprises a squared numeric parameter as a factor in said product of said management kernels.

9. A method of managing an electrical, electronic, electro-mechanical or computer system comprising:

receiving a plurality of management rules and associated management kernels, each management kernel comprising a prime number factor raised to a positive integer power;

receiving a code number identifying each managed entity of said system and an associated management scheme comprising a number; and undertaking a management action responsive to dividing said management scheme by one said prime number factor.

10. The method of claim 9 further comprising receiving a further code number and a further management scheme; and undertaking a further management action responsive to dividing said further management scheme by one said prime number factor.

11. The method of claim 9 wherein said management scheme comprises a number which comprises a product of selected ones of said management kernels.

12. The method of claim 9 wherein said undertaking of a management action further comprises, where a power to which said one said prime number factor is raised to derive a management kernel has a value of N, consecutively dividing said management scheme by said one said prime number raised to consecutive integer powers of from 1 to N until a non-integer result is obtained.

13. An electronic manager for an electrical, electronic, electro-mechanical or computer system comprising:

a directive acceptance and result reporting layer for receiving an indicator of each managed entity in said system and an associated control parameter;

a manager instructions and rules of operation layer;

a management kernel definition and redefinition layer which, together with said manager instruction and rules layer, has management kernels and associated management rules, each management kernel comprising a prime number factor raised to a positive integer power;

a mathematical manipulation layer for dividing each control parameter by ones of said management kernels;

a system entity information management layer responsive to said manager instructions and rules of operation layer, said management kernel definition and redefinition layer and said mathematical manipulation layer for deriving management rules; and a management plane communications capability layer responsive to said system entity information management layer for managing said system.

14. The manager of claim 13 including an operating system layer.

15. A computer readable medium for providing program control for a manager of a system comprising:

means for receiving a plurality of management rules and associated management kernels, each management kernel comprising a prime number factor raised to a positive integer power;

means for receiving a code number identifying each managed entity of said system and an associated management scheme comprising a number;

means for dividing said management scheme by one said prime number factor; and means for undertaking a management action responsive to said dividing.

* * * * *